United States Patent [19]

Taft

[11] Patent Number: 4,892,335

[45] Date of Patent: Jan. 9, 1990

[54] CARD CONSTRUCTION

[75] Inventor: Milton C. Taft, Whittier, Calif.

[73] Assignee: Rand McNally & Company, Skokie, Ill.

[21] Appl. No.: 931,364

[22] Filed: Nov. 14, 1986

[51] Int. Cl.⁴ .................... B42D 15/00; G09F 19/00; G09F 3/00; B41L 37/08

[52] U.S. Cl. ........................................ 283/75; 283/82; 283/109; 101/369

[58] Field of Search ................ 283/75, 82, 77, 89.1 R, 283/109, 101; 156/152, 293; 235/488, 493; 229/92.8, 92.7; D19/1; D20/10; D6/300; 446/147; 428/13, 67, 131, 137, 138, 140

[56] References Cited

U.S. PATENT DOCUMENTS

| Re. 25,005 | 7/1961 | Hannon . | |
|---|---|---|---|
| 2,291,173 | 7/1942 | Simpson | 229/92.8 |
| 2,622,526 | 12/1952 | Ross | 101/369 |
| 2,984,030 | 5/1961 | Hannon . | |
| 3,068,140 | 12/1962 | Biddle | 101/369 |
| 3,204,354 | 9/1965 | Berger . | |
| 3,266,714 | 8/1966 | Heuberger | 229/92.8 |
| 3,279,826 | 5/1967 | Rudershausen . | |
| 3,457,661 | 7/1969 | Peters | 283/109 |
| 3,512,286 | 9/1967 | Siegel . | |
| 3,676,644 | 7/1972 | Vaccaro | 283/82 |
| 3,726,471 | 4/1973 | Kalb | 229/92.8 |
| 3,896,726 | 7/1975 | Staats | 283/109 |
| 3,949,501 | 4/1976 | Andrews . | |
| 4,092,526 | 5/1978 | Beck | 283/82 |
| 4,101,701 | 7/1978 | Gordon . | |
| 4,330,350 | 5/1982 | Andrews . | |
| 4,507,550 | 3/1985 | Fleer | 283/82 |
| 4,568,824 | 2/1986 | Gareis . | |
| 4,648,189 | 3/1987 | Michel | 283/109 |

Primary Examiner—Douglas D. Watts
Assistant Examiner—Paul M. Heyrana
Attorney, Agent, or Firm—Nilsson, Robbins, Dalgarn, Berliner, Carson & Wurst

[57] ABSTRACT

A card construction is adapted for preparation of several information-carrying mediums, insertion of the mediums and completion of the construction at a location different than the location for the prior manufacturing of the construction. The construction is particularly formed to avoid false indications of a card edge in apparatus which receives the card, e.g., to read magnetically-coded information on the card or to initially encode such information on the card. The card construction incorporates: first and second protective coverings, each capable of transmitting information through the covering; and structure between the coverings defining first and second openings, the first opening disposed toward the first protective covering and the second opening disposed toward the second protective covering; wherein the openings have boundaries, along a boundary of the card construction, which are out of registration with one another. One of the protective coverings carries magnetic material for magnetically-coded information. In addition, the openings each have substantially rectangular-shaped boundaries and this boundary of one of the openings is disposed inwardly of the boundary of the other opening. The structure defining the openings incorporates substantially opaque material.

16 Claims, 1 Drawing Sheet

CARD CONSTRUCTION

FIELD OF THE INVENTION

This invention pertains to card constructions and, more particularly, laminated card constructions carrying magnetic material for magnetically-coded information.

BACKGROUND OF THE INVENTION

Laminated credit cards, identification cards and badge cards carrying information-bearing components such as photographs and identifying data have become widely used. These cards also commonly bear deposits of magnetic material to carry magnetically-coded information.

Most typically, the manufacturing of these items is done at one location and, e.g., the people to be photographed and the identifying data, initially, are at another location Thus, the completion of the manufacturing of the items, at the first location, generally occurs after such photographs and identifying data are provided from the second location.

Additionally, in apparatus which receives such cards, to apply or to read various information thereon, most particularly magnetically-coded information, edge detectors for the cards are commonly used. Typically, such detectors incorporate a light-emitting diodie (LED) and a photo-cell device to receive the beam of radiation from the diode. Thus, a break in such receipt then typically indicates an edge of a card. For example, detecting such an edge can be important in correlating where data is placed or present on the card, most particularly the magnetically-coded information, with the allocated or expected position for that data in the apparatus for applying or reading the data. An incorrect or false indication of an edge, then, can interfere with the proper operation of the apparatus.

The following are noted as representing background materials to the present subject matter: Siegel, U.S. Pat. No. 3,512,286, May 19, 1970; Peters, U.S. Pat. No. 3,457,661, July 29, 1969; Andrews, et al., U.S. Pat. No. 3,949,501, Apr. 13, 1976; Andrews, U.S. Pat. No. 4,330,350, May 18, 1982; Rudershausen et al., U.S. Pat. No. 3,279,826, Oct. 18, 1966; Hannon, U.S. Pat. No. 2,984,030, May 16, 1961; Hannon, Reissue Re. U.S. Pat. No. 25,005, originally issued Apr. 19, 1960, reissued July 4, 1961; Berger, U.S. Pat. No. 3,204,354, Sept. 7, 1965; Gareis et al., U.S. Pat. No. 4,568,824, Feb. 4, 1986; Gordon,e U.S. Pat. No. 4,101,701, July 18, 1978.

Siegel provides a credit card of thermoplastic material having a depression therein for a well adapted to receive a photograph. The well is surrounded by a shoulder forming a frame for a transparent window of flexible thermoplastic material which is bonded to the shoulder to seal in the photograph. Peters provides an opaque plastic core which can be printed on both sides, a transparent sheet on one side with an opening for a photograph, and transparent outside sheets.

In Andrews et al. '501, an opening in a preferably pigmented frame has peripheral dimensions which are approximately the same but slightly larger than the insert for the frame. A front sheet, carrying a strip of magnetic material, is preferably transparent and a back sheet is preferably opaque to provide a good background for embossed information thereon. In Andrews '350, again there is a strip of magnetic material. The frame has a well for an insert. However, a temporary insert element is provided in the well for support, for the outer envelope, e.g., during magentic coding.

Rudershausen et al. and the Hannon patents indicate, by way of example, that both the front and back of a card, and of an insert in the card, may carry information. In Berger, there are two identical photos. One appears through an opening in a sheet. The other is covered by the sheet which is reflective from the top. But the sheet passes sufficient light from the back so that, if a light is shone through the back, the second photo can be seen. This, of course, protects against tampering with the first photo that shows through.

Gareis et al. is representative of how, e.g., an identification card, can be provided with permanent magnets, magnetic sheets, magnetic tapes or metal sheets. Thus, magnetic locks or switches can be opened and coded magnetic information can be provided. Finally, Gordon, e.g., is indicative, by way of example, of the providing of embossed information.

The present subject matter conveniently provides the capability for completing manufacture of a card construction at a different location than that for the basic manufacturing, to efficiently incorporate photographs and other identifying information. It further, through its form, guards against false edge detection in apparatus which receives the card for applying or for reading information thereon.

SUMMARY OF THE INVENTION

In accordance with the invention, a card construction for carrying information, includes: first and second protective coverings, each capable of transmitting information through the covering; structure between the protective coverings defining first and second openings, the first opening disposed toward the first protective covering and the second opening disposed toward the second protective covering; wherein the openings have boundaries, along a boundary of the card construction, which are out of registration with one another. Such boundary of the first opening then is disposed inwardly of such boundary of the second opening.

The openings have substantially rectangular shaped boundaries' and this substantially rectangular shaped boundary of the first opening is then disposed inwardly of the substantially rectangular-shaped boundary of the second opening.

At least one of the protective coverings carries magnetic material for magnetically-coded information. Further, the structure defining the two openings includes substantially opaque material.

In a form prior to completion, the protective coverings and structure between such coverings are joined having the capability for sufficient separation for insertion of a first information-carrying medium in the first opening and a second information-carrying medium in the second opening. These information-carrying mediums also include substantially opaque material.

In a later form, the first information-carrying medium is disposed in the first opening and carries information which faces the first protective covering; the second information-carrying medium is disposed in the second opening and carries information which faces the second protective covering: and four sheet structures forming the two protective coverings and the structure defining the two openings are united to form a laminated structure.

DETAILED DESCRIPTION

Figure 2:
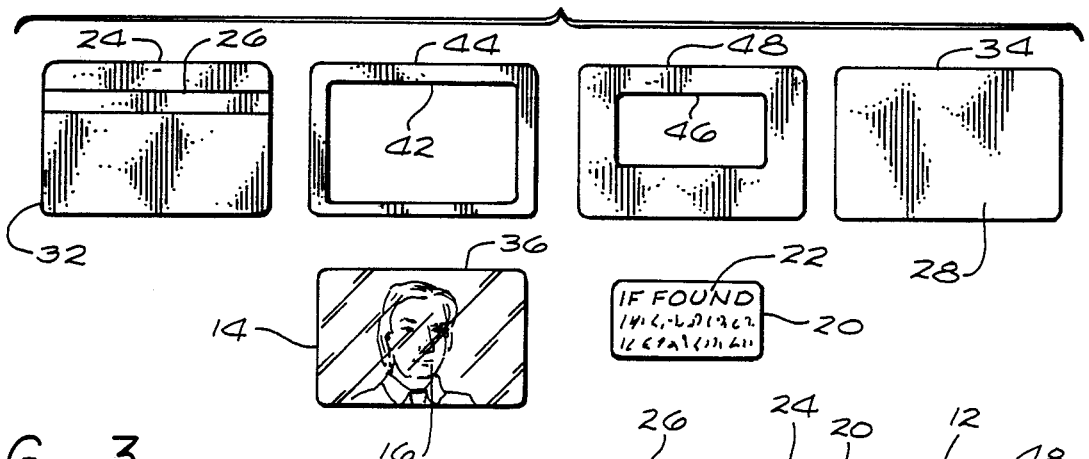
FIG. 2 shows the components separated.
Figure 3:
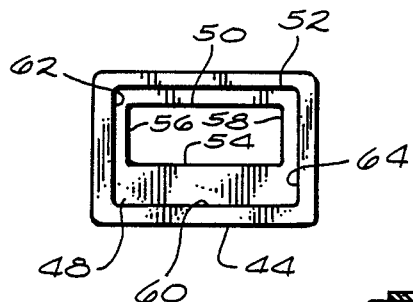
FIG. 3 shows two opening-defining center components, one on top of the other, to reveal the relationship between the openings.

By way of introduction, components of a card construction in accordance with the invention are shown, in separated form, in FIG. 2. In FIG. 3, in which the two opening-defining sheet structure components are stacked, one on the other, the relationship between the openings defined by these structures can be seen.

Figure 1:
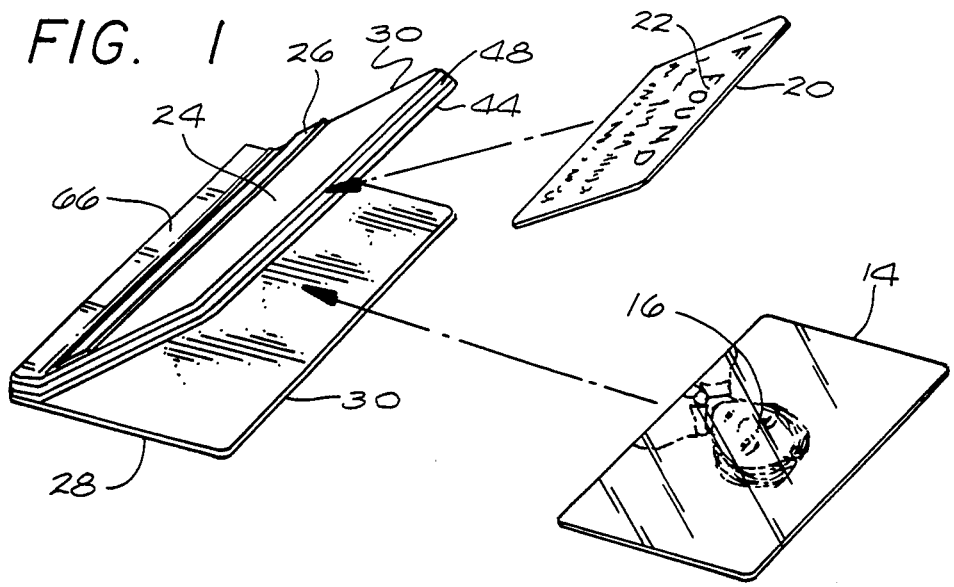
FIG. 1 shows the components of a card construction prior to insertion of two information-carrying mediums and completion of lamination of the construction.
Figure 4:
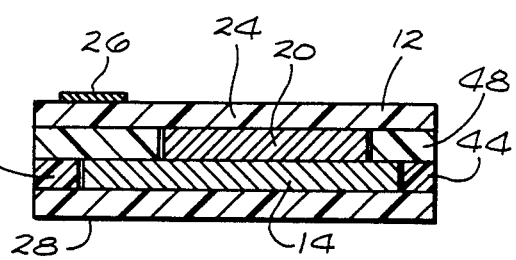
FIG. 4 is a sectional view through the completed card construction (sub-layers of components being omitted for convenience of illustration)

In FIG. 1, the card construction is completed, but for the insertion of a photograph-carrying medium and a data carrying medium and the lamination of the back covering to the remainder of the structure. In FIG. 4, the completed card construction is shown in cross-section; and in FIG. 5, an alternative embodiment, having opening-defining sheet structure components interchanged as to position, and information-carrying mediums interchanged as to position, is shown.

Turning to the subject matter in more detail, and particularly to FIGS. 1, 2 and 4, the card construction 12 shown therein, incorporates an information-carrying medium 14 which has a photograph of a person 16 thereon. It also incorporates another information-carrying medium 20 carrying data 22 thereon. As is typical, the photograph is assumed to be a photograph of the person who will carry and be identified by the card and the data is assumed to be a message, e.g., where to send the card if it is lost. Alternatively, or in addition, the data could incorporate identifying numbers or other identifying information for the bearer of the card or other parties of significance with regard to the bearer as, e.g., an employer or a bank which has issued the card to the bearer. In addition, the photograph-carrying medium could also incorporate data thereon. These alternatives and the methods of providing photographic information and data on information-carrying mediums are well-known and understood by those familiar with the art. Typically, the mediums will be conventional paper, plastic or combination plastic and paper products—one of a type which can readily accept a photograph directly transferred thereon or applied as an additional layer thereon or have a photograph develop or form thereon, and the other of a type which can readily accept, e.g., alpha numeric information in ink form.

The bearer and, for example, information incorporated in the data are typically available in one location—i.e. at an employer or bank issuing the card. However, the basic manufacturing and construction activity for the card typically occurs at another location—that of the manufacturer.

In the completed card construction, four sheet structure components are united in a laminated form. There is a back protective covering 24 carrying, in conventional fashion, magnetic material for magnetically-coded information, in the form of a stripe 26. Such a stripe of material, of course, has come to be conventionally employed to also carry information—e.g., identifying information for the bearer and/or information concerning a party related to the bearer, such as an employer or bank issuing the card. The magnetic material is typically a ferrous oxide material in a polymerized background, and can be readily applied as a liquid which hardens or as a tape, e.g., using a solvent, an adhesive, hot stamping or other conventional techniques.

The back protective covering 24, of course, is capable of transmitting information, from one side of the covering to the other, so that the information on the data-carrying medium 20 can be seen through the cover. Thus, the back covering is transparent, or at least sufficiently translucent for the desired viewing of the data.

Similarly, the sheet structure component forming the front protective covering 28 is also capable of transmitting information therethrough, from one side to the other, to provide viewing of the photograph. Thus it, also, is transparent, or at least sufficiently translucent to provide the desired viewing.

The card construction 12 has a substantially rectangular-shaped boundary 30, with rounded corners. In accordance with this, the back protective covering 24 has a boundary 32 having the same shape and the front protective covering 28 also has a boundary having this same shape.

As shown, although of different sizes than the coverings, the photograph-carrying medium 14 similarly has a rectangular-shaped boundary 36, with rounded corners; and the data-carrying medium 20 has a rectangular-shaped boundary 40, with rounded corners. The rectangular shapes, of course, are standard; and the rounded corners avoid sharp edges and, in the case of the mediums, provide convenient matching of the openings and the mediums which they receive.

The opening 42 to receive the photograph-carrying medium 14 is defined and provided by a front, center sheet structure component 44: and the opening 46 for the data-carrying medium 20 is defined and provided by a back, center sheet structure component 48. The size and shape of each opening is substantially the same as that of the information-carrying medium for the opening, with the medium, however, being slightly smaller for convenience of insertion of the medium in the opening. As is apparent from the drawings, each of the openings has a straight side which runs along and is parallel to a straight boundary of the card construction corresponding to that side.

The card construction, after it is issued, will typically have information on its magnetic stripe 26 read by apparatus adapted for that purpose. Apparatus of that sort often incorporates a device, such as a light-emitting diode (LED), which provides a narrow beam of radiant energy, and a photo-cell device to detect the beam or the absence of the beam. In this fashion, the edge of the card can be detected so that the apparatus can properly match and time the data it reads with the expected position of data along the stripe. For example, a number identifying a bank or employer may be expected along certain positions of the stripe; or a number identifying the individual may be along certain positions. Thus, this edge detection is of substantial significance. Even if, for example, the magnetic stripe did not extend to the edges of the card, such edge detection with, for example, an internal delay, would often be expected to be used.

A comparable edge detection situation often exists in the apparatus for encoding information on the magnetic stripe. Thus, the described form of edge detection, e.g., using a light-emitting diode and photo-cell device, is also often employed to match encoded information which is written on the stripe with the positions allocated for such information.

The relationship of the openings for the information-carrying mediums is of significance with regard to this edge detection. Specifically, as indicated, the mediums are slightly smaller than the openings for them. Thus, the small space between an edge of such an opening and the matching edge of such a medium can mistakenly provide an indication of a card edge. Specifically, if the beam which is employed for the edge detection can pass through the card when, as the card is inserted into the encoding or reading apparatus, the beam encounters the portion of the card where the space exists, then a mistaken edge detection can readily occur. This, of course, then interferes with the proper encoding of information, or reading of the coded information, on the magnetic stripe.

However, this edge detection situation is conveniently and efficiently addressed in the present subject matter. Specifically, and initially, as can be seen in FIG. 3, each of the straight boundaries of one of the rectangular-shaped openings is out of registration with the corresponding straight boundary of the other opening, which the first opening boundary runs along and is parallel to. This is readily apparent by reference to FIG. 3. With reference to the orientation in that figure, the upper, straight boundary 50 of the opening for the data-carrying medium is disposed inwardly of and, thus, out of registration with, the corresponding upper, straight boundary 52 of the opening for the photograph-carrying medium. Similarly, the lower, straight 54, left, straight 56 and right, straight 58 boundaries for the former are disposed inwardly of and, thus, out of registration with, respectively, the lower, straight 60, the left, straight 62 and the right, straight 64 boundaries of the latter. The substantially rectangular-shaped opening of the former, then, as a whole, including the rounded corners, is disposed inwardly of the substantially rectangular-shaped opening of the latter.

Along with this situation concerning the opening boundaries, the front, center sheet structure component 44 and the back, center sheet structure component 48 incorporate opaque material therein. Thus, they are opaque, or at least sufficiently opaque so as not to significantly transmit radiation therethrough of the type which is conventionally employed to provide edge detector beams in the magnetic-stripe encoding or reading apparatus of concern. Similarly, each of the information-carrying mediums incorporates opaque material and, thus, is opaque, or at least sufficiently opaque to satisfy the same criterion as for the two sheet structure components just discussed.

Figure 5:
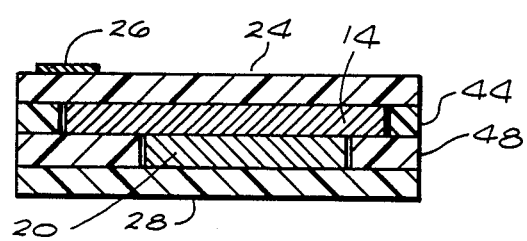
FIG. 5 is a sectional view through an alternative completed card construction having center components interchanged as to position.

The significance of the out-of-registration opening boundaries, and of the opaque aspect of four of the card components, in view of the above, is readily appreciated by reference to the figures, including FIG. 5 in which the positions of the central sheet structure components and the information-carrying mediums therein are reversed.

First, in the embodiment of FIGS. 1 and 4, it is apparent that the opaque aspect of the sheet structure component 48 having the opening for the data-carrying medium 20 will prevent any false edge detection at the small space between a boundary of the photograph-carrying medium and the opening therefor. Similarly, the opaque aspect of the photograph-carrying medium 14 will block any false edge detection at the small space between a boundary of the data-carrying medium and the opening therefor. Of peripheral interest, it might be noted that such edge detection is normally done along a portion of the card other than the position of the magentic stripe 26.

Continuing, in the alternative embodiment of FIG. 5, which is the same as the embodiment of FIG. 4 apart from the indicated reversing of positions, the opaque aspect of the sheet structure component 48 having the opening for the data-carrying medium 20 will block any false edge detection due to the small space along a boundary between the photograph-carrying medium 14 and the opening therefor. Similarly, the opaque aspect of the photograph-carrying medium will block any such false edge detection due to the space between a boundary of the data-carrying medium and of the opening therefor.

Referring to FIG. 1, in the embodiment of that figure, it is readily apparent that the data on the data-carrying medium 20 faces the back protective covering 24 of the card and the photograph on the photograph-carrying medium 14 faces the front protective covering 28. It of course is also readily apparent that, if for some reason such is desired, in accordance with a modification, the photograph could be applied to the smaller medium and the data to the larger medium.

Similarly, it is apparent that the sheet structure component 48 for the data-carrying medium 20 is disposed toward the rear protective covering 24, as opposed to the front protective covering 28 in the particular embodiment; and the sheet structure component 44 for the photograph-carrying medium is disposed toward the front protective covering 28, as opposed to the rear protective covering, in the embodiment. However, as already indicated, the reverse situation as to the disposition of these sheet structure components is employed in the alternative of FIG. 5.

FIG. 1 also conveniently illustrates how the card construction can be formed, apart from the provision of the two mediums with the information thereon and apart from a final lamination step, at a basic manufacturing facility for the cards. Then the omitted mediums with the information thereon and final lamination, can efficiently and conveniently be provided elsewhere.

Thus, in FIG. 1, the back protective covering 24 and the two center sheet structure components 44 and 48 have been heat laminated together already. However, the front protective covering 28 has been laminated to the other components only along a preliminary thin attachment strip 66 along one side of the card construction. The card construction, then, can be shipped from the manufacturing facility in this form. At another facility, the two information-carrying mediums can be provided with their information and cut to size. They can then be inserted in place, the smaller medium 20 for the data, first, through the larger opening into the opening for it, and the larger, photograph-carrying medium 14, second, in the opening for it. Then, if desired, at the same facility, the final laminating step, joining the front protective covering 28 along its inside surface, to the remainder of the construction, can be completed. It might be noted that this final lamination step might typically be of a less sophisticated nature than those in the basic manufacturing, on less sophisticated apparatus, perhaps at the issuer of the particular card or at a facility near such issuer. It may, also, in some circumstances, be desirable to apply the magnetic stripe 26 after such final laminating step. In regard to the embodiment of FIG. 5, the situation is, of course, reversed. The back protective covering 24 would have the initial lamination only along a strip so that the data-carrying medium can be inserted first and the photograph-carrying medium second.

The actual coding of the magnetic stripe can also typically be provided at the location where the final laminating step is provided. Of course, it will be recognized that the laminating process could still readily be performed at the basic manufacturing facility in total. This, however, calls for the facility to obtain or generate the information for the information-carrying mediums. The information-carrying mediums, of course, should respectively be essentially the same thickness as the sheet structure component defining the opening for the medium.

The formation process for the card generally can be performed according to a concurrent multi-card process or, alternatively, be based on a single card formation technique. In such a multi-card process, by way of example, large sheets can be provided for multiple center sheet structure components, and die-cutting of the openings in the sheets for many ultimate center components can be performed concurrently. Then, further by way of example, the large sheets can be laminated to one another, followed by the lamination, e.g., for the embodiment of FIGS. 1 and 4, of a large sheet of the material for the back protective coverings. Then individual card constructions, absent the front covering sheet components can be die-cut, thus incorporating the three indicated components. The edge of the front protective covering can then be individually laminated for each card construction. Alternatively, the edge lamination could also be accomplished, according to the large sheet approach, by selective lamination of such a large sheet before the cutting of the individual card constructions. The lamination can conveniently be accomplished through heated rollers. Cutting and lamination methods for card constructions of this general type, of course, are well known to those familiar with the art.

The formation process, as indicated, of course could also be on an individualized basis. Thus, the cutting of openings and of individual sheet structure components for a card can be done before any lamination with each card construction, then, laminated individually.

In the figures, and in the description heretofore, the form of the various sheet structure components, apart from their shapes, and their, at least heretofore implied, essentially plastic material nature, has not been addressed. This is in accordance with the fact that the sheet structure materials for these components typically are available from suppliers of such materials who undertake their formation.

Such available sheet structures most typically are each multi-layer materials themselves, including at least one layer for strength and sturdiness and one or more layers for adhesion to an adjacent sheet structure on the application of heat. For each of the card sheet structure components herein, a multi-layer form incorporating a polyester material layer for strength and sturdiness and a polyethylene copolymer material layer for adhesion is convenient and efficient. Particular examples are the sheet structures sold under the name Trans-Kote by Transilwrap Company. Such materials are generally formed by such company by laminating a polyethylene copolymer material layer to a polyester material layer after the application of an adhesive material formulation therebetween. For the protective coverings, Trans-Kote 5/2 CLEAR sheet structure is convenient and satisfactory—incorporating 5-mils of a polyester material and 2 mils of a polyethylene copolymer material. For the sheet structure component defining the opening for the photograph-carrying medium, Trans-Kote 3/4/3 WHITE is convenient and efficient—incorporating a polyester material 4-mils thick between polyethylene copolymer layers 3-mils thick. The WHITE—i.e., opaque—aspect is conveniently incorporated into one or both layers of the polyethylene copolymer. However, alternatively, it could be readily incorporated into the polyester material. Similarly, for the sheet structure component for the data-carryinq medium, Trans-Kote 1/4/1 WHITE is convenient and efficient—incorporating polyester material 4-mils thick between layers of polyethylene copolymer material 1-mil thick. As indicated, these materials and dimensions, of course, are merely exemplary.

In addition, many variations as to card construction size and opening size and location, in accordance with the principles herein, can be provided. One exemplary size specification is as follows:

| Description | Size |
| --- | --- |
| card length | 3.375 inches |
| card width | 2.125 inches |
| large opening length | 2.800 inches |
| large opening width | 1.795 inches |
| small opening length | 2.562 inches |
| small opening width | 1.156 inches |
| distance between each long edge of large opening and the parallel card edge nearest thereto | 0.165 inch |
| distance between each short edge of large opening and the parallel card edge nearest thereto | 0.287 inch |
| distance between long edge of small opening nearest a parallel card edge and such card edge | 0.284 inch |
| distance between each short edge of small opening and the nearest parallel card edge | 0.406 inch |

It, finally, might also be mentioned that, in accordance with an alternative method of construction, the openings in the two center sheet structure components 44 and 48 could, for example, initially not be fully cut through the sheetse—i.e., be scored. Thus, the cutting by the dies might be halted, for example, just short of passing all the way through the sheets, leaving center sections readily removable at a later stage, for example by the card issuer prior to insertion of the information-bearing mediums. Further, one center sheet structure component could be scored in this fashion and the other could be fully cut through with its center section maintained in place, until such removal, by virtue of lamination to the adjacent sheet structure in the general fashion of FIG. 1.

It, of course, will be readily apparent that many changes and modifications in the embodiments which have been specifically described may be carried out without departing from the scope or spirit of the invention.

What is claimed is:

1. A card construction for carrying information, comprising:

first and second protective coverings, each capable of transmitting information through said covering;

structure between said protective coverings defining first and second openings positioned to communicate with one another in the direction of the thickness of the card construction, said first opening disposed toward said first protective covering and said second opening disposed toward said second protective covering, said openings having boundaries, along a boundary of the card construction, which are out of registration with one another; and a first information-carrying medium in said first opening having a front face and a back face, said front face of said first information-carrying medium carrying information and facing said first protective covering, and a second information-carrying medium in said second opening having a front face and a back face, said front face of said second information-carrying medium carrying information and facing said second protective covering, said mediums being positioned in said openings to abut each other along said back faces.

2. A card construction as defined in claim 1 wherein at least one of said protective coverings carries magnetic material for magnetically-coded information.

3. A card construction as defined in claim 2 wherein said magnetic coding material forms a stripe of said material.

4. A card construction as defined in claim 1 wherein said out-of-registration opening boundaries are substantially parallel to one another.

5. A card construction as defined in claim 1 wherein said boundary of said first opening is disposed inwardly of said boundary of said second opening.

6. A card construction as defined in claim 1 wherein said first and second openings have substantially rectangular-shaped boundaries.

7. A card construction as defined in claim 6 wherein said substantially rectangular-shaped boundary of said first opening is disposed inwardly of said substantially rectangular-shaped boundary of said second opening.

8. A card construction as defined in claim 1 wherein said structure defining said openings comprises substantially opaque material.

9. A card construction for carrying information, comprising:

first and second protective coverings, each capable of transmitting information through said covering;

structure between said protective coverings-defining first and second overlapping openings positioned to communicate with one another in the direction of the thickness of the card construction, said first opening disposed toward said first protective covering and said second opening disposed toward said second protective covering, said openings having boundaries, along a boundary of the card construction, which are out of registration with one another, said boundary of said first opening being disposed inwardly of said boundary of said second opening; and a first information-carrying medium in said first opening having a front face and a back face, said front face of said first information-carrying medium carrying information and facing said first protective covering, and a second information-carrying medium in said second opening having a front face and a back face, said front face of said second information-carrying medium carrying information and facing said second protective covering, said mediums being positioned in said openings to abut each other along said back faces.

10. A card construction as defined in claim 9 wherein at least one of said protective coverings carries magnetic material for magnetically-coded information.

11. A card construction as defined in claim 10 wherein said magnetic coding material forms a stripe of said material.

12. A card construction as defined in claim 9 wherein said opening boundaries are substantially parallel to one another.

13. A card construction as defined in claim 9 wherein said first and second openings have substantially rectangular-shaped boundaries.

14. A card construction as defined in claim 13 wherein said substantially rectangular-shaped boundary of said first opening, along all portions of said boundary, is disposed inwardly of said substantially rectangular-shaped boundary of said second opening.

15. A card construction as defined in claim 9 wherein said structure defining said openings comprises substantially opaque material.

16. A card construction as defined in claim 9 wherein said first and second information-carrying mediums comprise substantially opaque material.

* * * * *

UNITED STATES PATENT AND TRADEMARK OFFICE
CERTIFICATE OF CORRECTION

PATENT NO.   : 4,892,335
DATED        : January 9, 1990
INVENTOR(S)  : Milton C. Taft It is certified that error appears in the above-identified patent and that said Letters Patent is hereby corrected as shown below:

| Column | Line | |
|---|---|---|
| 1 | 20 | "location Thus," should be -- location. Thus, --. |
| 1 | 46 | "Hannon, Reissue Re. U.S. Pat. No. 25,005," should read -- Hannon, U.S. Reissue Pat. No. Re. 25,005, --. |
| 1 | 50 | "Gordon,e" should read -- Gordon, --. |
| 3 | 5 | "construction:" should read -- construction; --. |
| 4 | 41 | "component 44:" should read -- component 44; -- |
| 8 | 58 | "sheetse" should read -- sheets --. |
| 10 | 8 | "coverings-defining" should read -- coverings defining --. |

Signed and Sealed this

Fifth Day of February, 1991

Attest:

HARRY F. MANBECK, JR.

*Attesting Officer*   *Commissioner of Patents and Trademarks*